United States Patent
Johnson et al.

(10) Patent No.: US 7,888,440 B2
(45) Date of Patent: Feb. 15, 2011

(54) POLYMERIZATION OF ACRYLIC POLYMERS IN REACTIVE DILUENTS

(75) Inventors: Jeffery W. Johnson, Rochester, MI (US); Robert R. Matheson, West Bloomfield, MI (US); Donald A. White, Auburn Hills, MI (US); Neville Everton Drysdale, Newark, DE (US); Patrick Henry Corcoran, Cherry Hill, NJ (US); Laura Ann Lewin, Greenville, DE (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 431 days.

(21) Appl. No.: 11/999,803

(22) Filed: Dec. 7, 2007

(65) Prior Publication Data

US 2008/0287622 A1 Nov. 20, 2008

Related U.S. Application Data

(60) Provisional application No. 60/873,796, filed on Dec. 7, 2006.

(51) Int. Cl.
*C08F 2/14* (2006.01)

(52) U.S. Cl. .......... 526/213; 526/89; 526/194; 526/204; 526/217

(58) Field of Classification Search ........... 526/89, 526/194, 204, 213, 217
See application file for complete search history.

(56) References Cited

U.S. PATENT DOCUMENTS 4,771,102 A * 9/1988 Goel et al. ............. 525/28
2004/0082735 A1 * 4/2004 Yeats et al. ............ 525/476

* cited by examiner

*Primary Examiner*—James Seidleck
*Assistant Examiner*—Vu A Nguyen
(74) *Attorney, Agent, or Firm*—Gann G. Xu

(57) ABSTRACT

The present process is directed to preparation of addition polymers in diluents that are subsequently reactive in coatings during cure, instead of in traditional hydrocarbon solvents. The polymers so prepared can be used as the main film-forming polymer in high solids coating compositions, especially those useful for finishing automobiles and truck exteriors.

7 Claims, No Drawings

POLYMERIZATION OF ACRYLIC POLYMERS IN REACTIVE DILUENTS

CROSS-REFERENCE TO RELATED APPLICATION

This application claims priority under 35 U.S.C. §119 from U.S. Provisional Application Ser. No. 60/873,796 (filed Dec. 7, 2006), the disclosure of which is incorporated by reference herein for all purposes as if fully set forth.

TECHNICAL FIELD

This process relates to use of reactive diluents in the preparation of addition polymers, and to addition polymers so prepared and their use in high solids crosslinkable coating compositions, especially coatings useful for finishing automobile and truck exteriors.

BACKGROUND OF THE INVENTION

Most coatings used for finishing automobile and truck exteriors contain one or more film-forming polymers, optional crosslinking agents, and volatile organic solvents. The presence of volatile organic solvents is of concern, however, because they form the bulk of the emissions produced during application and curing of the coating composition which need to be controlled due to governmental regulations. Accordingly, there have been many attempts to reduce the emissions or VOC (volatile organic content) of such coatings.

One avenue for reducing regulated emissions has been to use waterborne coatings. While waterborne coating compositions offer lower emissions, they still contain significant amounts of organic co-solvent, and also have more elaborate and expensive handling and application requirements.

Powder coatings also have very low organic emissions but require complete reinvestment in the paint facilities and to date have not exhibited the appearance and other properties desired.

Another avenue for reducing regulated emissions has been to increase the solids content of solvent borne liquid coatings. The solids content of solvent borne liquid coatings can be increased by several methods, such as the use of lower molecular weight polymers or oligomers, and by using less organic solvent. The advantages of this approach include the exceptional appearance, durability and properties of such systems and the ability for them to be used in a current automotive plant with little or no change in facilities. At some point, however, the polymer solution becomes too viscous. This causes major problems with handling during manufacturing and also with the ability to spray or otherwise apply the coating onto the motor vehicle, thus requiring added solvent that increases the undesirable VOC content.

Another way to attain higher solids is to use reactive diluents, such as ethylene glycol or glycerol, in the final paint to keep the spray viscosity within acceptable limits. In these coatings, however, the film-forming polymer must be stripped of environmentally adverse hydrocarbon solvents that are used in the polymer synthesis before being introduced in the coating. The stripping step adds complexity, time and expense to the polymer synthesis and is therefore undesirable.

The object of the present invention is to provide an alternative to conventional environmentally hazardous organic liquid carrier solutions to attain high solids (low VOC) paints that can be applied with relative ease.

SUMMARY OF THE INVENTION

In one aspect, the present invention is a process for producing a polymer, said process comprising the step: polymerizing at least one ethylenically unsaturated monomer in the presence of a catalyst and a liquid carrier, wherein said liquid carrier is a reactive diluent, said reactive diluent having at least two reactive sites.

In another aspect, the present invention is a composition comprising;
  (a) at least one ethylenically unsaturated monomer;
  (b) at least one reactive diluent; and
  (c) at least one catalyst suitable to catalyze the polymerization of said ethylenically unsaturated monomer;

wherein said reactive diluent is selected from selected from the group consisting of alkoxy silanes, alkoxy silicates, amide acetals, ketimines, cyclic carbonates, orthoesters, spiro-orthoesters, bicyclic orthocarbonates, or a combination thereof.

DETAILED DESCRIPTION

In one embodiment, the present process provides a means for producing addition polymers using reactive diluents as the liquid carrier rather than using conventional organic solvents as the liquid carrier, permitting the attainment of high solids (low VOC) paints with viscosity low enough for application using standard methods, such as, spraying, brushing, roller coating, dipping, etc. Preferably, the polymers produced are (meth)acrylic polymers which, when used herein, means that the polymers produced contain at least 50 percent by weight of (meth)acrylate monomers. The (meth)acrylic polymers preferably contain at least one crosslinkable functional group per molecule. Suitable crosslinkable functional groups can be chosen from hydroxyl, silane, epoxide, carboxyl, anhydride, isocyanate, carbamate, amine, or a combination thereof.

The term "(meth)acrylate" or "(meth)acrylic" means methacrylate or acrylate and can be used to describe both monomers and/or polymers.

As used herein, "reactive diluents" shall mean compounds or materials capable of functioning as solvent for the components of an addition polymerization process of the present invention, wherein said compounds or materials do not react to any substantial degree with the monomers used or polymer formed during the addition polymerization process, but wherein said compounds or materials have functionality that can be reacted subsequent to the addition polymerization process in the presence of the monomer or polymer. Preferably, reactive diluents of the present invention act as a solvent for both the monomers and for the polymer produced.

Reactive diluents of the present invention have at least two reactive sites that can react with a crosslinking agent to form part of a growing polymer chain and/or polymer network, in the case of a crosslinkable coating composition. The reactive sites on the reactive diluent may be masked or unmasked. A masked site is one that needs to undergo a chemical transformation, such as hydrolysis, to 'expose' the reactive site. Examples of 'masked' reactive diluents include amide acetals, ketimines, cyclic carbonates, orthoesters, spiro-orthoesters, and bicyclic orthocarbonates. An unmasked reactive site is one that can undergo a condensation reaction without any such transformation. An example of a masked reactive site is found in the spiro-orthoesters that can undergo hydrolysis to expose hydroxy groups. An unmasked reactive site is one such as an alkoxy silane. In the presence of water and an acid catalyst, such molecules can self-condense or can react with other functional groups present in the composition.

As indicated above, reactive diluents suitable for use herein can function as a solvent in the polymerization reaction of the selected monomers and do not substantially react with functional groups on the monomers/polymer during polymerization or interfere with the polymerization. Therefore, the reactive diluents should be carefully chosen so that they substantially do not react with the crosslinkable functional groups present in the polymer. The reactive diluent should be selected such that it does not catalyze either the polymerization or any crosslinking reactions. While it is desirable that no reaction between the diluent and the monomer or polymer component should occur, it is understood that minor side reactions may occur between the diluent and the functional groups on the monomer/polymer during polymerization, depending in part on the choice of diluent and polymerization components. Minor side reactions can be acceptable, although not preferred because it is desirable not to build additional viscosity and molecular weight that would result from substantial reaction between the monomer or polymer component and the reactive diluent. By "minor side reactions" or "substantially do not react" it is meant that less than 5 wt % of the diluent, by weight of the total diluent, reacts with the monomer or polymer component. Preferably less than 2 wt % of the diluent reacts with the monomer or polymer, more preferably less than 1 wt %. It is most preferred to have 0 wt % of the diluent react with the monomer and/or polymer.

Various types of polymerizations can be carried out using the disclosed process, such as free radical, anionic, group transfer and atom transfer radical polymerization reactions. Free radical polymerization reactions are generally preferred. Reaction temperature suitable for use in the present method are within the range of about 50° C. to 200° C., preferably in the range of about 70 to 160° C. The reaction is also typically carried out under atmospheric pressure. Advantageously, the disclosed process does not require the use of volatile organic solvents, while still being able to maintain the low viscosities desired for coating formulations.

The polymers produced by this process include acrylic polymers and copolymers, styrenated acrylic copolymers, styrene polymers and copolymers, vinyl acetate polymers and copolymers, and the like. Dispersed gelled acrylic polymers and copolymers can also be made using this process. These polymers are commonly referred to as non-aqueous dispersed polymers or NAD polymers. One method of preparing NAD polymers is to form a macromonomer that acts as a polymeric stabilizer component when it is subsequently chemically grafted to a crosslinked core. The linear stabilizer components are soluble in the organic liquid used to form the NAD while the core is insoluble in this liquid.

The term "condensation polymerization" or "condensation reaction" shall mean, for the purposes of the present invention, a reaction between two functional groups wherein a new chemical bond is formed, such as the reaction between an isocyanate functionality and a hydroxy or amine group; the reaction of a melamine with a hydroxy or an amine group; the reaction of an epoxy group with a carboxyl group or an amine group. The self-condensation of alkoxysilanes would be included in this definition, as would the self-condensation of alkoxysilicates.

When a polymerized mixture is used as a coating, the reactive diluent can react with itself and/or one or more film-forming polymers and/or crosslinking agents in the coating during the curing process, so as to become a permanent part of the coating film applied to a substrate. Several classes of reactive diluents have been identified. In some cases, the reactive diluent can undergo condensation polymerization reactions under the influence of heat and/or a catalyst. In other cases, the reactive diluent must be transformed, generally by undergoing a hydrolysis reaction, to reveal the crosslinkable functional groups of the reactive diluent. This hydrolysis reaction can take place by contacting the reactive diluent with a sufficient amount of water and/or a catalyst. In one embodiment, water vapor in the air can be sufficient to hydrolyze the reactive diluent.

In general, the monomers comprise about 20 percent to 90 percent by weight based on the weight of the monomers and the reactive diluent. Preferably, the monomers comprise 25 percent to 85 percent by weight based on the weight of the monomers and the reactive diluent, more preferably from about 50 to 75 percent by weight based on the weight of the monomers and the reactive diluent.

It is preferred that the ethylenically unsaturated monomers be a mixture, preferably including at least two different (meth)acrylic monomers. The present process can be applied to the preparation of copolymers from mixtures of two or more (meth)acrylic monomers. In another embodiment mixtures of at least one (meth)acrylic monomer and at least one non-(meth)acrylic monomer such as a styrenic monomer may be polymerized in accordance with the present process.

The term "(meth)acrylic monomer" as employed herein includes acrylic or methacrylic acid, esters of acrylic or (meth)acrylic acid and derivatives and mixtures thereof, such as but not limited to (meth)acrylamides and (meth)acrylonitriles. Individually, they are referred to as "(meth)acrylic" monomers. Examples of suitable (meth)acrylic monomers are (meth)acrylate esters such as alkyl (meth)acrylates that have 1-18 carbon atoms in the alkyl group such as methyl (meth)acrylate, ethyl (meth)acrylate, n-propyl (meth)acrylate, n-butyl (meth)acrylate, isopropyl (meth)acrylate, isobutyl (meth)acrylate, t-butyl (meth)acrylate, n-amyl (meth)acrylate, n-hexyl (meth)acrylate, isoamyl (meth)acrylate, 2-ethylhexyl (meth)acrylate, nonyl (meth)acrylate, lauryl (meth)acrylate, stearyl (meth)acrylate, and the like. Cycloaliphatic (meth)acrylates also can be used such as trimethylcyclohexyl (meth)acrylate, t-butylcyclohexyl (meth)acrylate, cyclohexyl (meth)acrylate, isobornyl (meth)acrylate, and the like. Aryl (meth)acrylates can also be used such as benzyl (meth)acrylate, phenyl (meth)acrylate, and the like.

Other suitable (meth)acrylic monomers include (meth)acrylic acid derivatives such as: (meth)acrylic acid and its salts, (meth)acrylonitrile, (meth)acrylamide, N-alkyl (meth)acrylamide, N,N-dialkyl (meth)acrylamide, N-phenyl-(meth)acrylamide and (meth)acrolein.

Apart from (meth)acrylic monomers, other polymerizable non-(meth)acrylic monomers that can be used for forming the polymer include vinyl aromatics such as styrene, alpha-methyl styrene, t-butyl styrene, vinyl toluene; vinyl acetate, and vinyltrimethoxy silane, or a combination thereof. When used, non-(meth)acrylic monomer(s) are typically present at a level of at least 1 percent and up to about 20 percent by weight of the total monomer mixture, and the balance (meth)acrylic monomers.

Functionalized versions of any of the monomers listed above may be used in the preparation of the polymer to impart crosslinkable functionality to the polymer. The functional groups on such monomers should be capable of crosslinking with themselves or with other film-forming polymers. Typically crosslinking functional groups include hydroxyl, silane, epoxide, carboxyl or other acid, anhydride, isocyanate, carbamate, and amine groups. Combinations of monomers containing the above-mentioned crosslinking functional groups are also suitable, provided that they do not react with each other under polymerization and storage conditions. While practicing this approach, functional monomers that are reactive under addition polymerizing conditions with the reactive diluents should be avoided.

Typical ethylenically unsaturated monomers that can be used to introduce crosslinking functional groups into the polymer during its polymerization include epoxy functional acrylic monomers such as glycidyl (meth)acrylate; carboxyl or other acid functional monomers such as (meth)acrylic acid, maleic acid, itaconic acid, styrene sulfonic acid, acrylamido methyl propane sulfonic acid, vinyl phosphonic or vinyl phosphoric acid; hydroxy functional acrylic monomers such as hydroxyethyl (meth)acrylate, hydroxypropyl (meth)acrylate, 2-hydroxypropyl (meth)acrylate, 3-hydroxypropyl (meth)acrylate, hydroxybutyl (meth)acrylate; amine functional monomers such as t-butyl amino ethyl (meth)acrylate, dimethyl amino ethyl (meth)acrylate, aminoalkyl (meth) acrylates; isocyanate functional monomers such as isocyanatoethyl (meth)acrylate; carbamate functional (meth)acrylic monomers such as 2-(methoxycarbonyl)aminoethyl (meth) acrylate, 2-(cyclohexoxycarbonyl)aminoethyl (meth)acrylate and 2-propenyloxyethyl carbamate; silane functional (meth)acrylic monomers such as vinyl or (meth)acrylic alkoxy silane monomers such as vinyl trimethoxy silane, vinyl methyldimethoxy silane, vinyl triethoxy silane, and vinyl tris (2-methoxyethoxy) silane, gamma-(meth)acryloxy propyl trimethoxysilane, gamma-(meth)acryloxy propyl trimethoxysilane, and gamma-(meth)acryloxypropyltris(2-methoxyethoxy) silane; and the like.

When used, the functional group containing monomers are typically present at a level of at least 2 percent and up to 40 percent by weight of the total monomer mixture.

Other possibilities for introducing functional groups into the polymer, such as by post reaction of an epoxy group with water or acid to form a hydroxy group, will be apparent to persons skilled in the art. This type of post-reaction to form a functional group should be undertaken with care so as not to cause a condensation reaction with the reactive diluent.

The selection of a particular reactive diluent and its level of addition are made based on the monomers selected, the desired applications for the polymer produced and also to assist in controlling reaction parameters. Suitable reactive diluents for the present process should of course at least be capable of dissolving the monomers and/or polymer formed therefrom. In general, it is preferred to use as little reactive diluent as possible so as to minimize the formation of by-products and contaminants.

Reactive diluents which are suitable for use in the present process include materials that contain at least one, preferably at least two reactive groups that do not react with the monomer or the polymer during the addition polymerization, but that are capable of later reacting through condensation reaction with a crosslinking agent and/or other film-forming polymers present in the coating composition during cure. Multifunctional reactive diluents having from about 2 to 25 condensation reactive sites are generally preferred. The reactive diluent may be a compound or a polymeric material. If the reactive diluent is polymeric, it is preferably a low molecular weight polymer, most preferably, a liquid oligomeric material.

The reactive diluents according to the present disclosure include alkoxy silanes, alkoxy silicates, amide acetals, ketimines, cyclic carbonates, orthoesters, spiro-orthoesters, bicyclic orthocarbonates, or a combination thereof.

Suitable alkoxy silane functional reactive diluents contain 2 or more hydrolyzable silane groups such as, dialkoxy diakylsilanes or trialkoxy alkylsilanes. Examples of these include but are not limited to alkoxysilated 4-vinyl cyclohexene, alkoxysilated limonene, 5-(2-trimethoxysilylethyl)-trialkoxysilylnorbornane, 1,4-bis[3-trialkoxysilylpropyloxymethyl]cyclohexane, and other silane containing compounds with more than one trialkoxysilyl group, disclosed in U.S. Pat. No. 5,719,251 which is herein incorporated by reference; 1,2-bis(trialkoxysilyl)ethane, 1,6-bis(trialkoxysilyl)hexane, 1,8-bis(trialkoxysilyl)octane, 1,4-bis(trialkoxysilylethyl) benzene, 1,5,9-tris(trialkoxysilyl)cyclododecatriene, 1,2,4-tris(2-trialkoxysilylethyl)cyclohexane, other silane containing compounds, with more than one trialkoxysilyl group, disclosed in U.S. Pat. No. 6,080,816 which is herein incorporated by reference; bis(3-trialkoxysilyl-2-hydroxypropyl) succinate, other silane containing compounds, with more than one trialkoxysilyl group, disclosed in U.S. Pat. No. 6,268,456 which is herein incorporated by reference; an oligomer produced when bis(trialkoxysilyl)-limonene is contacted with water, other silane containing compounds, with more than one trialkoxysilyl group, disclosed in U.S. Pat. No. 6,329,489 which is herein incorporated by reference.

In the presence of water (i.e., atmospheric moisture) and acid catalyst alkoxysilanes can subsequently react after application on a substrate with functional groups such as hydroxyl groups in a polymer to crosslink the polymer or with a hydroxyl group-containing reactive diluent to form polymer that can crosslink. In addition alkoxysilanes are capable of self-condensation. In either case the resulting product is a silicate bond so that either a polysilicate is formed or an alkyl bridged silicate crosslink which are both known to provide durable, tough and weatherable coating compositions.

Alkoxy silicate functional reactive diluents can also be used. These include but are not limited to tetraethyl silicate, hexaethyl disilicate and other oligomers of tetraethyl silicate, tetramethyl silicate, hexamethyl disilicate and other oligomers of tetramethylsilicate, 1,2-ethanediyl hexamethyl disilicate, 1,2-propanediyl hexamethyl disilicate, 1,3-propanediyl hexamethyl disilicate, 1,4-butanediyl hexamethyl disilicate, 1,4-cyclohexylmethylenediyl hexamethyl disilicate, 1,2,6-hexanetriyl trisilicate. Alkoxy silicates, in the presence of water and acid catalyst, can react with hydroxyl groups, can self condense, and can react with alkoxysilanes. Alkoxy silicates produce polymers and crosslinks similar to alkoxy silanes and are useful because they are lower cost, however they are less hydrolysis resistant, an important consideration in outdoor exposure, particularly resistance to acid rain which leads to a phenomenon called acid etch and is of particular importance for clear coats used for high quality automotive finishes. Often a useful balance of properties can be found in blends of silicates and silanes.

Amide acetal reactive diluents can also be used. Amide acetals are compounds according to the structural formula (I);

(I)

wherein $R_1$, $R_2$, $R_3$, and $R_4$ each are independently selected from the group of $C(R_6)_2$ and $C(R_6)_2C(R_6)_2$; $R_5$ is selected from H and an optionally substituted alkyl group having 1 to 20 carbons; and each $R_6$ is independently chosen from H, optionally substituted alkyl group having from 1 to 20 carbons, optionally substituted aryl groups having from 6 to 20 carbons, optionally substituted alkyl esters having from 1 to 20 carbons, or optionally substituted aralkyl groups having from 6 to 20 carbons.

These include but are not limited to 1-aza-(3,5,7-trimethyl)-4,6-dioxabicyclo[3.3.0]octane, 1-aza-(3,7-dimethyl-5-butyl)-4,6-dioxabicyclo[3.3.0]octane, 1-aza-(5-methyl)-4,6-dioxabicyclo[3.3.0]octane, 1-aza-(5-butyl)-4,6-dioxabicyclo[3.3.0]octane, 1-aza-(5-n-undecyl)-4,6-dioxabicyclo[3.3.0]octane, 1-aza-(5-(4-cyanobutyl)-4,6-dioxabicyclo[3.3.0]octane, 1-aza-(5-cyclooctyl)-4,6-dioxabicyclo[3.3.0]octane, 1-aza-(4-methyl-3-cyanopropyl)-4,6-dioxabicyclo[3.3.0]octane.

Once applied on a substrate the amide acetals can ring open in the presence of suitable catalyst and water to produce dihydroxy compound or a compound with a secondary amine and a hydroxy group or in most cases a blend of the two products depending on the structure of the amide acetal. The hydroxy groups can react with partially or fully alkoxylated melamine formaldehyde resin, polyisocyanates, alkoxy silanes, alkoxy silicates and anhydrides. The amine containing compounds can react with alkoxylated melamine formaldehyde resins, polyisocyanates, and epoxy resins. The above crosslinking agents can be combined as desired. Suitable results can also be obtained by employing combinations of crosslinking agents such as alkoxylated melamine formaldehyde resin and silane; alkoxylated melamine formaldehyde resin and polyisocyanate; polyisocyanate and epoxy; alkoxylated melamine formaldehyde resin, silane and silicate; melamine, silane and polyisocyanate.

One can combine an alkoxysilane functionality with a bicyclo amide acetal, for example 1-aza-(3-trimethoxysilylpropyl)-4,6-dioxabicyclo[3.3.0]octane, 1-aza-(3-triethoxysilylpropyl)-4,6-dioxabicyclo[3.3.0]octane to produce reactive diluents with multiple functionalities.

Ketimine reactive diluents can also be used. These include but are not limited to 1,3,3-trimethyl-N-(1,3-dimethylbutylidene)-5-[(1,3-dimethylbutylidene)amino]cyclohexane, sold commercially under the name Desmophen® LS 2965 by Bayer AG, Pittsburgh, Pa.; N1,N3-Bis(1,3-dimethylbutylidene)diethylenetriamine available commercially from Air Products of Allentown, Pa.; other ketimines disclosed in U.S. Pat. No. 6,605,688 herein incorporated by reference; ketimines disclosed in U.S. Pat. No. 6,297,320 herein incorporated by reference. Ketimines form amines when exposed to water and a suitable catalyst and the amines so formed can be reacted with polyisocyanates, to form polyureas; with polyepoxides to form hydroxy polyamines; and with melamines to form alkyl bridged condensed melamine polymer.

Cyclic monocarbonates and polycyclocarbonates are useful reactive diluents. Monocarbonates on ring opening form two hydroxy groups so they can react to form polymer, however polycyclocarbonates are favored because of their greater reactivity. Polycyclocarbonates of the present invention, can be but are not limited to:

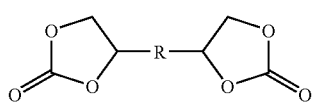

II where R in formula (II) denotes an organic linking group such as linear alkyl group with 1-18 carbon atoms; branched or cyclic alkylgroup with 3-18 carbon atoms; and aryl group with 6-18 carbon atoms.

Alcohols and polyols can be converted to carbonates by reacting with epichlorohydrin to produce an epoxy ether and subsequent reaction with carbon dioxide to convert the epoxy to carbonate functionality. Formula (III) illustrates this structure that is formed when using a diol;

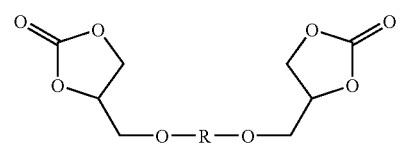

III where R denotes an organic linking group such as linear alkyl group with 1-18 carbon atoms; branched or cyclic alkylgroup with 3-18 carbon atoms; and aryl group with 6-18 carbon atoms. Many polyols can suitably be converted to polycarbonates useful as a reactive diluent.

Other useful polycarbonates can be obtained from epoxy compounds by reaction with carbon dioxide. Particularly useful epoxy compounds are oligomers containing glycidyl (meth)acrylate and compounds such as hydrogenated bisphenol A diepoxide.

Polycarbonates when subsequently reacted with polyamines produce hydroxyurethane polymer. If either the polycarbonate or formed polyamine has more than 2 functional groups, then such polymer can also crosslink. In addition the hydroxy group formed on ring opening of the carbonate ring after application on a substrate can react with melamine (e.g., partially or fully alkoxylated melamine formaldehyde resins); with polyisocyanate; and/or with polyanhydrides to produce crosslinked polymer.

Other protected hydroxyl compounds can be useful reactive diluents because they tend to lower viscosity because hydrogen bonding is minimized. Of particular utility among these compounds are bicyclic orthocarbonates, orthoesters, and spiro-orthoester functional compounds which are disclosed in U.S. Pat. No. 6,593,479, incorporated by reference herein.

Various methods can be employed to prepare spiro-orthoester compounds. One such method is the reaction of an epoxy-functional compound such as butyl glycidyl ether with a lactone such as caprolactone or butyrolactone. Alternatively, spiro-orthoester functional polymers can be prepared from epoxy-functional polymers, e.g., polyacrylates of glycidyl (meth)acrylate, using lactones, or by forming polylactones using monoepoxides. Again, use may be made of catalyst such as Lewis acid or Bronsted acids, preferably paratoluene sulfonic acid of $BF_3Et_2O$.

Many of these protected hydroxy compounds are useful as they do not produce volatile organic by-products that could contribute to VOC. Once applied to a substrate in the presence of moisture from the air and optionally provided with an acid catalyst, these protected hydroxyl compounds will be hydrolyzed and ring open to give polyhydroxy compounds that can be reacted with melamine to give bridged condensed melamines; with polyisocyanates to give polyurethane polymers; and with polyanhydrides to give polyesters.

As indicated above, the selection of the reactive diluents will vary depending on the monomers selected and the type of polymer intended to be produced. (Meth)acrylic polymer systems are of importance in automotive coating systems in use today at vehicle assembly plants and collision repair shops. The reactive diluents of the present process can be used to reduce the VOC of these coatings. Hydroxy functional (meth) acrylic film-forming polymers are perhaps the most common type of polymers in use. Also in use today is an acid etch resistant clear coating that contains silane functional acrylic polymers. Another commercially important coating is a dual silane/hydroxy acrylic polymer. All three of these film-forming polymers can be produced in the present reactive diluents that will lower the VOC of the coatings and help to make them more environmentally friendly.

Referring again to the polymerization process employing these reactive diluents, in a free-radical polymerization process, the type of polymerization catalyst suitable for use in the present process is known in the art to depend upon the desired temperature for the reaction. Suitable catalysts include azo and peroxide type initiators, chosen from but not limited to, the following: t-butyl peroxide, t-butyl peroxybenzoate, t-butyl peroctoate, cumene hydroperoxide, 2,2'-azobis(isobutyronitrile) (Vazo® 64 thermal initiator supplied by Du Pont Company, Wilmington, Del.); 4,4'-azobis(4-cyanovaleric acid) (Vazo® 52 thermal initiator supplied by Du Pont Company, Wilmington, Del.) and 2-(t-butylazo)-2-cyanopropane, benzoyl peroxide, or a combination thereof. It is preferred to add from about 0.1 to about 8.0 percent by weight of the monomer mixture of the polymerization catalyst. The choice of polymerization catalyst is important when choosing the reactive diluent. If a reactive diluent is chosen that is sensitive to acidic conditions, then care must be taken when using peroxide catalysts as the by-products of these materials are generally acidic in nature.

Where desired, a chain transfer agent may be employed in the present process. Chain transfer agents which are suitable for use in the above reaction include, but are not limited to, the following: dodecyl mercaptan, mercaptoacetic acid, mercaptopropionic acid, octyl mercaptan, 2-mercaptoethanol, and combinations thereof. Where employed, it is preferred to use an amount of chain transfer agent in the range of from about 0.5 to about 2.0 percent by weight of the monomer mixture of chain transfer agent.

It can be optional to add, in addition to the diluent, an organic solvent in the present process. Suitable organic solvents include aromatic solvents, aliphatic solvents, esters, glycol ethers, glycol ether esters, ketones and combinations thereof. Where employed, it is preferred to use an amount of organic solvent in the range of about 1 percent to about 20 percent by weight of the reaction mixture. It is, however, generally desired to keep the reaction free of organic solvent to achieve the maximum benefit of this process.

In one embodiment a batch polymerization process is employed for the addition polymerization reaction. The residence time for such batch processes is commonly in the range of about 1 hour to about 10 hours. In a second embodiment the addition polymerization reaction may be conducted via the use of a continuous stirred tank polymerization process. The residence time for such continuous processes is commonly in the range of about 90 minutes to about 6 hours; with the preferred residence time being in the range of about 2 hours to about 3 hours. In still another embodiment a fully continuous process can be used where the residence time is in the range of 0.5 minutes to 10 minutes. The polymerization process described herein comprises polymerizing at least one ethylenically unsaturated monomer, at least one reactive diluent, and at least one catalyst suitable to catalyze the polymerization of the monomer is run at a temperature that is sufficient to cause polymerization of the monomers in the presence of the catalyst, typically from about 50° C. to about 200° C. Optionally, a suitable chain transfer agent and/or a suitable organic solvent may be used in the polymerization.

It is well within the ability of one skilled in the art to produce coatings from these polymer compositions that approach 100 percent by weight total solids and have a VOC approaching 0 lbs/gal (0 kg/L). Coating compositions made from addition polymers produced by the disclosed process contain relatively small percentages of volatile organic solvents, preferably less than 10 percent non-volatiles.

In another embodiment, the present invention is a composition comprising at least one ethylenically unsaturated monomer; at least one reactive diluent; and at least one catalyst suitable to catalyze the polymerization of said ethylenically unsaturated monomer; wherein said reactive diluent is selected from selected from the group consisting of alkoxy silanes, alkoxy silicates, amide acetals, ketimines, cyclic carbonates, orthoesters, spiro-orthoesters, bicyclic orthocarbonates, or a combination thereof.

The addition polymers produced can be combined with at least one crosslinking agent to form the coating composition. The crosslinking agents are chosen from the group of polyisocyanates, melamine resins, amino resins, blocked polyisocyanates, or a combination thereof and are well known to those skilled in the art. Also, the crosslinking agent can be chosen from polyepoxides, polycarboxylates, polyamines, polyols, or a combination thereof. It may also be possible to use as the crosslinking agent, a moiety that contains more than one type of crosslinking moiety. For examples, N,N-diethanol amine contains both amine and hydroxyl functionality and may serve as a crosslinking agent. Care must be taken not to introduce combinations of crosslinking moieties that are incompatible with one another, for example, acid groups and epoxide groups will react with one another under certain conditions.

As appreciated in the art, the exact components and properties of components desired for any coating application can vary and, therefore, routine experimentation may be required to determine the optional components and proportions of components for a given application and desired properties.

The polymers and copolymer solutions produced herein are particularly useful as binders in clear coat finishes that are applied over a colored basecoat, in order to form an attractive color-plus-clear composite finish over automobile and truck exteriors.

The following Examples illustrate the process. All parts and percentages are on a weight basis unless otherwise indicated. All molecular weights disclosed herein are determined by GPC (gel permeation chromatography) using polymethyl methacrylate as the standard.

EXAMPLE 1

Preparation of an Amide Acetal Reactive Diluent

1-Aza-(3,7-dimethyl-5-n-undecyl)-4,6-dioxabicyclo [3,3,0]octane

Undecyl nitrile (92.8 g, 0.509 mol), diisopropanolamine (67.7 g, 0.508 mol) and zinc acetate (1.87 g, 0.010 mol) were contacted in a three-neck flask equipped with stirrer and an input for nitrogen. The reactor contents were heated to and held at 130° C. for 5 hours and then at 150° C. for an additional about 18 hours under a nitrogen atmosphere.

The reaction mixture was cooled to room temperature. The resulting solution had a Pt—Co# of 81 and gas chromatographic analysis indicated a conversion of 82.2% of the nitrile to the desired product.

The color analyses were done using a UV spectrophotometer and ASTM method D5386-93b. The result is given as a Pt—Co number and is an indication of the yellowness of the sample. The lower the number, the less yellow is the sample. A value of zero is comparable to the color of pure water.

EXAMPLE 2

Preparation of a Hydroxyl Functional Acrylic Polymer in Reactive Diluent

Amide Acetal

To a 5-liter glass flask equipped with an agitator, thermometer, water condenser, nitrogen inlet and heating mantle was added 800 grams dodecane amide acetal (1-aza-(5-n-undecyl)-4,6-dioxabicyclo[3.3.0]octane prepared above. This mixture was agitated and heated to 155° C. While maintaining the batch at 155° C., a mixture of 260 grams 1,6-hexanediol diacrylate, 1440 grams 2-ethyl hexyl acrylate, 80 grams hydroxyethyl methacrylate, 20 grams t-butylperoxy acetate was added over a 300 minute period. Then the reaction mixture was held at 155° C. for an additional 60 minutes. The weight solids of the resulting polymer solution was 94.3%.

EXAMPLE 3

Preparation of a Hydroxy Functional Acrylic Polymer in Reactive Diluent

Amide Acetal

To a 1-liter glass flask equipped with an agitator, thermometer, water condenser, nitrogen inlet and heating mantle was added 200 grams dodecane amide acetal (1-aza-(5-n-undecyl)-4,6-dioxabicyclo[3.3.0]octane. This mixture was agitated and heated to 120° C. While maintaining the batch at 120° C., a mixture of 125 grams styrene, 215 grams butyl methacrylate, 160 grams hydroxyethyl acrylate, 30 gms t-butylperoxy octoate was added over a 300 minute period. Then the reaction mixture was held at 120 C for an additional 60 minutes. The weight solids of the resulting polymer solution was 90.0%.

EXAMPLE 4

Preparation of a Silane Functional Macromonomer in Silane Reactive Diluent

To a 5-liter glass flask equipped with an agitator, thermometer, water condenser, nitrogen inlet and heating mantle was added 92.4 grams 2-ethyl hexylmethacrylate, 46.2 grams gamma-methacryloxypropyl trimethoxysilane, 92.39 grams isobutyl methacrylate and 740.3 grams of a reactive diluent (a mixture of 1-trimethoxy ethyl silyl-3-trimethoxysilyl cyclohexane and 1-trimethoxy ethyl silyl-4-trimethoxysilyl cyclohexane). This mixture was agitated and degassed by bubbling nitrogen through the solution for 30 minutes. Then the mixture was heated to 70° C. After the mixture had stabilized at 70° C., the following solution was added as a shot: 115 grams ethyl acetate, 0.08 grams Co(II)DPG and 2.9 grams Vazo 52. After the batch stabilized at 70 C, a mixture of 831.5 gms 2-ethylhexyl methacrylate, 415.7 grams gamma-methacryloxypropyl trimethoxysilane, 831.5 grams isobutyl methacrylate, 46.4 grams heptane was added over a 180 minute period. Simultaneously with this monomer mixture, a mixture of 250 grams ethyl acetate and 26.1 grams Vazo® 52 were fed to the reactor over 330 mins. Then the reaction mixture was held at 70 C for an additional 30 minutes. After the hold, a mixture of 30 grams heptane and 1 gm. t-butyl peroxyoctoate was feed to the reactor over 60 mins. After completion of this feed the reaction mixture was held at 70 C for an additional 30 mins. The weight solids of the resulting polymer solution was 69.3%. Number average molecular weight of the polymer was 52,305 and polydispersity was 2.5, determined by GPC.

EXAMPLE 5

Preparation of Silane and Hydroxyl Functional NAD in Amide Acetal Reactive Diluent To a 5-liter glass flask equipped with an agitator, thermometer, water condenser, nitrogen inlet and heating mantle was added 761.0 grams of the macromonomer prepared in Example 4 and 358.0 grams of the same reactive diluent as used in Example 4. This mixture was agitated and degassed by bubbling nitrogen through the solution for 15 minutes. The batch was then brought to 70° C. and a mixture of 140.4 grams hydroxypropyl acrylate, 396.9 grams methyl methacrylate, 109.6 grams methyl acrylate, 6.6 grams styrene and 3.4 grams allyl methacrylate was added to the reactor over a 210 minute period. A mixture of 17.9 grams ethyl acetate, 55 grams mineral spirits and 10.1 grams Vazo 52 was added simultaneously with the previous mixture over a 210 minute period. Then the reaction mixture was held at 70° C. for an additional 120 minutes. The weight solids of the resulting polymer solution was 68.5% and the Brookfield viscosity measured at 25° C. was 650 centipoise using a #3 spindle at 5 rpm.

EXAMPLE 6

Preparation of an Acrylic Polymer in Bicyclic Amide Acetal Reactive Diluent

To a 2-liter glass flask equipped with an agitator, thermometer, water condenser, nitrogen inlet, and a heating mantel was charged 211.56 grams of dodecane amide acetal. The reaction was heated to 100° C. A mixture of 391.39 grams isobornyl acrylate and 137.52 grams 2-hydroxyethyl methacrylate was fed to the reaction over a 4-hour period. A mixture of 13.22 grams Vazo 67 initiator in 52.89 grams of the dodecane amide acetal was added concurrently with the monomer charge. The initiator was fed over a 5 hour period, keeping the reaction at 100° C. When the initiator charge was complete, the reaction was allowed to cool to room temperature and 197.0 grams of acetone was added to the mixture. The weight solids of the resulting polymer solution was 81.3% and the Gardner-Holdt viscosity was x. The polymer had a number average MW of 4919 and a weight average MW of 11531.

EXAMPLE 7

4-Ethyl-1-methyl-2,6,7-trioxa-bicyclo[2.2.2]octane

Trimethylolpropane (268.0 g, 2.0 mol), triethyl orthoacetate (356.4 g, 2.20 mol) and toluene sulfonic acid (4.0 g) were charged into a oven dried round bottom flask equipped with a stirring bar, distillation head and under nitrogen. The resulting solution was heated until the theoretical amount od ethanol was collected. The reaction was cooled to room temperature. Fractional vacuum distillation afforded the product as a water clear liquid, boiling point 62.8-71.2° C. at 0.78-1.80 torr. Yield: 276.0 g (87.3%)

EXAMPLE 8

Preparation of 3,9-Dibutyl-3,9-Diethyl-1,5,7,11-tetraoxaspiro[5,5]undecane

In a three neck 500 mL RB flask equipped with a reflux condenser, a Dean-Stark trap and under nitrogen, 2-butyl-2-ethyl-1,3-propanediol (35.33 g, 0.22 mol) and toluene (350 mL) were added. The resulting mixture was heated to reflux for 2 h. The resulting solution was cooled to RT and 4-ethylbenzenesulfonic acid (0.35 g) and tetraethylorthocarbonate (21.3 g, 0.11 mol) were added. The reaction mixture was heated to reflux and the azeotropic solution collected in the Dean-Stark trap. The azeotropic mixture was measured and removed from the trap and poured into brine. The toluene phase was separated giving ~22 mL of ethanol, via shaking with brine. TLC of the reaction mixture showed the complete conversion of the starting diol. To the cooled reaction mixture was added triethylamine (3.0 mL). The reaction mixture was then concentrated at reduced pressure (rotovap) and then dried under vacuum. This crude material was then fractionally vacuum distilled and the fraction boiling at 170-18° C. at 1.8 torr and collected (24.72 g) as a water white clear liquid.

EXAMPLE 9

Ketimine Used

Purchased from Bayer

Ketimine from isophorone diamine and 2 moles of methyl isobutylketone (1,3-dimethyl-butylidene)-{3-[(1,3-dimethyl-butylidene)-methyl]-3-methyl-cyclohexyl}amine-4-ethyl-1-methyl-2,6,7-trioxa-bicyclo[2.2.2]octane (available from Bayer as Desmophen IS-2965A).

EXAMPLE 10

Preparation of an Acrylic Polymer in Bicyclic Orthocarbonate Reactive Diluent

To a 2-liter glass flask equipped with an agitator, thermometer, water condenser, nitrogen inlet, and a heating mantel was charged 211.56 grams of 3,9-dibutyl-3,9-diethyl-1,5,7,11-tetraoxaspiro[5,5]undecane. The reaction content was heated to 100° C. A mixture of 391.39 grams isobornyl acrylate, 137.52 grams 2-hydroxyethyl methacrylate, 10.58 grams Vazo 67 initiator and 42.31 grams 3,9-dibutyl-3,9-diethyl-1,5,7,11-tetraoxaspiro[5,5]undecane was added over a 4-hour period. Then a solution of 2.64 g of Vazo 67 initiator, 10.58 g 3,9-dibutyl-3,9-diethyl-1,5,7,11-tetraoxaspiro[5,5]undecane, and 36.78 grams of acetone was added over one hour at 100° C. After completion the reaction solution was stirred at 100° C. for 30 minutes. The reaction was cooled to room temperature and 299.64 grams of acetone added to give a Gardner-Holdt viscosity of Y, with a solid content of 68.36. At this point the batch is close to the gel point.

EXAMPLE 11

Preparation of an Acrylic Polymer in Bicyclic Orthoester Reactive Diluent

To a 2-liter glass flask equipped with an agitator, thermometer, water condenser, nitrogen inlet, and a heating mantel was charged 211.56 grams of 4-ethyl-1-methyl-2,6,7-trioxa-bicyclo[2.2.2]octane. The reaction content was heated to 100° C. A mixture of 391.39 grams isobornyl acrylate, 137.52 grams 2-hydroxyethyl methacrylate, 10.58 grams Vazo 67 initiator and 42.31 grams 4-ethyl-1-methyl-2,6,7-trioxa-bicyclo[2.2.2]octane was added over a 4-hour period. Then a solution of 2.64 grams of Vazo 67 initiator, 10.58 grams 4-Ethyl-1-methyl-2,6,7-trioxa-bicyclo[2.2.2]octane, and 36.78 grams of acetone was added over one hour at 100° C. After completion the reaction solution was stirred at 100° C. for 30 minutes. The reaction was cooled to room temperature and 156.64 grams of acetone added to give a Gardner-Holdt viscosity of V, with a solid content of 80%.

EXAMPLE 12

Preparation of an Acrylic Polymer in Ketimine Reactive Diluent

To a 2-liter glass flask equipped with an agitator, thermometer, water condenser, nitrogen inlet, and a heating mantel was charged 211.56 grams of the ketimine from isophorone diamine and 2 moles of methyl isobutylketone (1,3-dimethyl-butylidene)-{3-[(1,3-dimethyl-butylidene)-methyl]-3-methyl-cyclohexyl}amine-4-ethyl-1-methyl-2,6,7-trioxa-bicyclo[2.2.2]octane (available from Bayer as Desmophen IS-2965A). The reaction content was heated to 100° C. A mixture of 391.39 grams isobornyl acrylate, 137.52 grams 2-hydroxyethyl methacrylate, 10.58 grams Vazo 67 initiator and 42.31 grams Desmophen IS-2965A was added over a 4-hour period. Then a solution of 2.64 grams of Vazo 67 initiator, 10.58 g Desmophen IS-2965A, and 36.78 grams of acetone was added over one hour at 100° C. After completion the reaction solution was stirred at 100° C. for 30 minutes. The reaction was cooled to room temperature and 156.64 grams of acetone added to give a Gardner-Holdt viscosity of V, with a solid content of 80%.

COATING EXAMPLE 1

In a glass jar 50.01 grams of the material from example 6 was combined with 8.75 of propylene glycol monomethylether acetate, 2.78 grams of a 10% dibutyl tin dilaurate solution in ethyl acetate, and 0.67 grams of a BYK 306 and 0.24 grams of Byk 361. To this was added 37.55 grams of a solution of 13.26 grams of Desmodur 3300 (hexamethylene diisocyanate trimer available from Bayer), 21.67 grams of Desmodur Z4470BA (isophorone diisocyanate trimer available from Bayer) and 2.63 grams diisobutyl ketone. This mixture was stirred stirred and then 0.22 grams of acetic acid was added and the mixture and stirred. The mixture was drawndown to give coatings of ~2 mils in thickness. At one day the coating had a Fischercope hardness of 43 N/mm2, and a swell ratio of 1.58. At 30 days the Tg (at the midpoint) was 58 C and the gel fraction was 90%.

Film Preparation

The clearcoats were drawn down over Uniprime (ED-5000), TPO, using a 6 mil drawdown blade.

Micro-Hardness

The micro-hardness of the coatings was measured using a Fischerscope hardness tester (model HM100V). The tester was set for maximum force of 100 mN ramped in series of 50, 1 second steps. The hardness was recorded in $N/mm^2$.

Swell Ratio

The swell ratio of the free films (removed from TPO) was determined by swelling in methylene chloride. The free film was placed between two layers of aluminum foil and using a LADD punch, a disc of about 3.5 mm diameter was punched out of the film. The aluminum foil was removed from either side of the free film. Using a microscope with 10× magnification and a filar lens the unswollen diameter ($D_O$) of the film measured. Four drops of methylene chloride were added to the film, the film was allowed to swell for a few seconds and then a glass slide was placed over it. The swell ratio was then calculated as:

$$\text{swell ratio} = (D_S)^2/(D_O)^2$$

What is claimed is:

1. A process for producing a polymer, said process comprising the step: polymerizing at least one ethylenically unsaturated monomer in the presence of a catalyst and a liquid carrier, wherein said liquid carrier is a reactive diluent that is substantially non-reacting with said at least one ethylenically unsaturated monomer and components of said polymer during said process, said reactive diluent having at least two reactive sites, wherein said reactive diluent is selected from the group consisting of amide acetal, ketimine, cyclic carbonate, orthoester, spiro-orthoester, bicyclic orthocarbonate, and a combination thereof.

2. The process of claim 1 wherein the reactive diluent is an amide acetal.

3. The process of claim 1 wherein said polymer is selected from the group consisting of (meth)acrylic polymer and styrenated (meth)acrylic polymer.

4. The process of claim 3 wherein said polymer contains at least one crosslinkable functional group.

5. The process of claim 1 wherein the polymerization is performed at a temperature sufficient to polymerize the ethylenically unsaturated monomer.

6. A composition obtained by the process of claim 3 and further comprising a crosslinking agent.

7. A composition comprising;
   (a) at least one ethylenically unsaturated monomer;
   (b) at least one reactive diluent that is substantially non-reacting with said at least one ethylenically unsaturated monomer; and
   (c) at least one catalyst suitable to catalyze the polymerization of said ethylenically unsaturated monomer in a process to form a polymer;

wherein said reactive diluent is selected from the group consisting of amide acetals, ketimines, cyclic carbonates, orthoesters, spiro-orthoesters, bicyclic orthocarbonates, and a combination thereof, and said reactive diluent is substantially non-reacting with components of said polymer during said process.

* * * * *